United States Patent
Arndt et al.

(10) Patent No.: US 10,656,414 B2
(45) Date of Patent: May 19, 2020

(54) PROJECTION ARRANGEMENT FOR A HEAD-UP DISPLAY (HUD)

(71) Applicant: SAINT-GOBAIN GLASS FRANCE, Courbevoie (FR)

(72) Inventors: Martin Arndt, Aachen (DE); Stefan Gossen, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 301 days.

(21) Appl. No.: 15/578,222

(22) PCT Filed: Jun. 10, 2016

(86) PCT No.: PCT/EP2016/063407
§ 371 (c)(1),
(2) Date: Nov. 29, 2017

(87) PCT Pub. No.: WO2016/198679
PCT Pub. Date: Dec. 15, 2016

(65) Prior Publication Data
US 2018/0149865 A1 May 31, 2018

(30) Foreign Application Priority Data

Jun. 11, 2015 (EP) .................................... 15171630

(51) Int. Cl.
*G02B 27/01* (2006.01)
*B32B 17/10* (2006.01)
(Continued)

(52) U.S. Cl.
CPC .... *G02B 27/0101* (2013.01); *B32B 17/10036* (2013.01); *B32B 17/10568* (2013.01);
(Continued)

(58) Field of Classification Search
CPC ........ G02B 27/0172; G02B 2027/0178; G02B 27/0176; G02B 27/0101; G02B 2027/0118
(Continued)

(56) References Cited

U.S. PATENT DOCUMENTS

| 5,013,134 A | 5/1991 | Smith |
| 5,130,174 A | 7/1992 | Esposito |

(Continued)

FOREIGN PATENT DOCUMENTS

| CN | 101888927 A | 11/2010 |
| CN | 103153607 A | 6/2013 |

(Continued)

OTHER PUBLICATIONS

Aclocque, J.P., "Double Vision as a Disturbing Optical Failure of the Windshield," Z. Glastechn. Ber., May 1970, vol. 43(5), 16 pages, (English translation + German original).

(Continued)

*Primary Examiner* — Mohammed A Hasan
(74) *Attorney, Agent, or Firm* — Pillsbury Winthrop Shaw Pittman LLP

(57) ABSTRACT

A projection arrangement for a head-up display (HUD) is presented. The arrangement has a vehicle windshield that includes an outer pane and an inner pane bonded to one another via a thermoplastic intermediate layer. The vehicle windshield has an upper edge, a lower edge, and an HUD region. The arrangement also has a projector that is aimed at the HUD region to generate a virtual image perceivable by an observer situated within an eyebox. According to one aspect, the windshield has an HUD reference point, at which a central beam running between the projector and the center of the eyebox strikes the inner pane. According to another aspect, the thickness of the thermoplastic intermediate layer (Continued)

Figure 1:
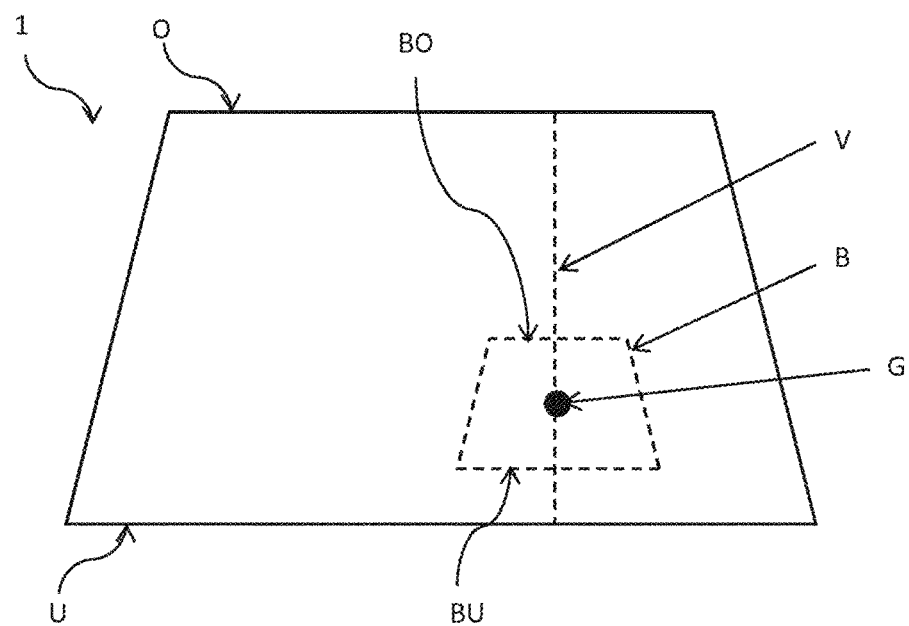

in the vertical course between the upper edge and the lower edge in at least a section corresponding to the HUD region is variable according to a wedge angle.

21 Claims, 4 Drawing Sheets

(51) Int. Cl.
  *B60J 1/02* (2006.01)
  *G02B 27/00* (2006.01)
(52) U.S. Cl.
  CPC .......... *B32B 17/10761* (2013.01); *B60J 1/02* (2013.01); *G02B 27/01* (2013.01); *B32B 2605/006* (2013.01); *B60Y 2400/92* (2013.01); *G02B 27/0018* (2013.01); *G02B 2027/0121* (2013.01); *G02B 2027/0194* (2013.01)
(58) Field of Classification Search
  USPC ........................................................ 359/630
  See application file for complete search history.

(56) References Cited

U.S. PATENT DOCUMENTS

| | | | |
|---|---|---|---|
| 5,504,622 A | 4/1996 | Oikawa et al. | |
| 5,812,332 A | 9/1998 | Freeman | |
| 5,945,199 A | 8/1999 | Morin et al. | |
| 8,075,983 B2 | 12/2011 | Masaki et al. | |
| 8,451,541 B2* | 5/2013 | Labrot | B32B 17/10036 359/630 |
| 8,764,923 B2 | 7/2014 | Durbin et al. | |
| 9,067,386 B2 | 6/2015 | Miyai | |
| 9,915,822 B2 | 3/2018 | Arndt et al. | |
| 10,234,681 B2 | 3/2019 | Arndt et al. | |
| 10,350,859 B2 | 7/2019 | Arndt et al. | |
| 2002/0086141 A1 | 7/2002 | Sauer et al. | |
| 2004/0109251 A1 | 6/2004 | Freeman et al. | |
| 2004/0166288 A1 | 8/2004 | Travis et al. | |
| 2005/0142332 A1 | 6/2005 | Sauer | |
| 2006/0210776 A1 | 9/2006 | Lu et al. | |
| 2007/0009714 A1 | 1/2007 | Lee et al. | |
| 2007/0020465 A1 | 1/2007 | Thiel et al. | |
| 2007/0082219 A1 | 4/2007 | Fleury et al. | |
| 2007/0148472 A1 | 6/2007 | Masaki et al. | |
| 2008/0176043 A1 | 7/2008 | Masaki et al. | |
| 2009/0294212 A1 | 12/2009 | Miyai | |
| 2010/0314900 A1 | 12/2010 | Labrot et al. | |
| 2011/0189426 A1 | 8/2011 | Durbin et al. | |
| 2012/0025559 A1 | 2/2012 | Offermann et al. | |
| 2012/0094084 A1* | 4/2012 | Fisher | B32B 17/10036 428/174 |
| 2013/0149503 A1 | 6/2013 | Yamamoto et al. | |
| 2013/0188260 A1 | 7/2013 | Matsushita et al. | |
| 2013/0249942 A1 | 9/2013 | Green et al. | |
| 2013/0316158 A1 | 11/2013 | Rehfeld et al. | |
| 2014/0011000 A1 | 1/2014 | Dunkmann et al. | |
| 2014/0319116 A1 | 10/2014 | Fischer et al. | |
| 2014/0354692 A1 | 12/2014 | Ng-Thow-Hing et al. | |
| 2014/0362434 A1 | 12/2014 | Schmitz et al. | |
| 2014/0375816 A1 | 12/2014 | Maihoefer | |
| 2016/0291324 A1 | 10/2016 | Arndt et al. | |
| 2016/0320616 A1 | 11/2016 | Ichii | |
| 2017/0003503 A1 | 1/2017 | Arndt et al. | |
| 2017/0274630 A1 | 9/2017 | Oota et al. | |
| 2017/0313032 A1 | 11/2017 | Arndt et al. | |
| 2018/0149867 A1 | 5/2018 | Kremers et al. | |
| 2018/0157033 A1 | 6/2018 | Arndt et al. | |
| 2018/0297331 A1 | 10/2018 | Gahagan | |
| 2019/0329529 A1 | 10/2019 | Schulz | |

FOREIGN PATENT DOCUMENTS

| | | |
|---|---|---|
| CN | 103249581 A | 8/2013 |
| DE | 102007059323 A1 | 6/2009 |
| DE | 102008008758 A1 | 8/2009 |
| DE | 102013012648 A1 | 3/2014 |
| DE | 102014001710 A1 | 8/2014 |
| DE | 102014005977 A1 | 9/2014 |
| EP | 1800855 A1 | 6/2007 |
| EP | 1880243 A2 | 1/2008 |
| EP | 1800855 B1 | 2/2013 |
| FR | 2680584 A1 | 2/1993 |
| JP | H02-257189 A | 10/1990 |
| JP | H03209210 A | 9/1991 |
| JP | 2004536009 A | 12/2004 |
| JP | 2007-223883 A | 9/2007 |
| JP | 2008201667 A | 9/2008 |
| JP | 2009035444 A | 2/2009 |
| JP | 2011-505330 A | 2/2011 |
| JP | 2011207645 A | 10/2011 |
| JP | 2013001613 A | 1/2013 |
| JP | 2014-504229 A | 2/2014 |
| JP | 2017502124 A | 1/2017 |
| KR | 0135743 | 4/1998 |
| KR | 10-2010-0094987 A | 8/2010 |
| KR | 20100094987 A | 8/2010 |
| KR | 10-2012-0028902 A | 3/2012 |
| WO | 03/024155 A2 | 3/2003 |
| WO | 2006122305 A2 | 11/2006 |
| WO | 2009/071135 A1 | 6/2009 |
| WO | 2010/121986 A1 | 10/2010 |
| WO | 2012/029916 A1 | 3/2012 |
| WO | 2012/073030 A1 | 6/2012 |
| WO | 2013/104438 A1 | 7/2013 |
| WO | 2013/104439 A1 | 7/2013 |
| WO | 2013136374 A1 | 9/2013 |
| WO | 2014079567 A1 | 5/2014 |
| WO | WO 2015/041324 A1 | 3/2015 |
| WO | 2015/086233 A1 | 6/2015 |
| WO | 2015/086234 A1 | 6/2015 |
| WO | 2015/134836 A1 | 9/2015 |
| WO | 2016/091435 A1 | 6/2016 |
| WO | 2016/198678 A1 | 12/2016 |
| WO | 2017/157660 A1 | 9/2017 |

OTHER PUBLICATIONS

Final Office Action for U.S. Appl. No. 15/039,794, filed May 26, 2016, on behalf of Saint-Gobain Glass France, dated Dec. 12, 2018. 31 pages.
International Search Report for Application No. PCT/EP2014/074115 filed Nov. 10, 2014 on behalf of Saint Gobain Glass France, dated Jan. 21, 2015, 5 pages (English Translation + German Original).
International Search Report for Application No. PCT/EP2014/074116 filed Nov. 10, 2014 on behalf of Saint-Gobain Glass France, dated Jan. 21, 2015. 5 pages. (English Translation + German Original).
International Search Report for Application No. PCT/EP2015/073625 filed Oct. 13, 2015 on behalf of Saint-Gobain Glass France, dated Dec. 9, 2015. 7 pages (German Original+ English Translation).
International Search Report for Application No. PCT/EP2017/054735 filed Mar. 1, 2017 on behalf of Saint-Gobain Glass France, dated May 24, 2017, 9 pages (English Translation+ German Original).
Non-Final Office Action for U.S. Appl. No. 15/038,321, filed May 20, 2016 on behalf of Saint-Gobain Glass France, dated May 9, 2017, 13 pages.
Non-Final Office Action for U.S. Appl. No. 15/039,794, filed May 26, 2016 on behalf of Saint-Gobain Glass France, dated Feb. 22, 2018. 27 pages.
Non-Final Office Action for U.S. Appl. No. 15/881,576, filed Jan. 26, 2018 on behalf of Saint-Gobain Glass France, dated Mar. 28, 2018. 6 pages.
Non-Final Office Action for U.S. Appl. No. 15/531,718, filed May 30, 2017 on behalf of Saint-Gobain Glass France, dated Jul. 23, 2018. 9 pages.

(56) References Cited

OTHER PUBLICATIONS

Notice of Allowance for U.S. Appl. No. 15/038,321, filed May 20, 2016 on behalf of Saint-Gobain Glass France, dated Aug. 28, 2017, 9 pages.
Notice of Allowance for U.S. Appl. No. 15/038,321, filed May 20, 2016 on behalf of Saint-Gobain Glass France, dated Nov. 9, 2017, 7 pages.
Notice of Allowance for U.S. Appl. No. 15/531,718, filed May 30, 2017, on behalf of Saint-Gobain Glass France, dated Jan. 10, 2019. 11 pages.
Notice of Allowance for U.S. Appl. No. 15/881,576, filed Jan. 26, 2018, on behalf of Saint-Gobain Glass France, dated Nov. 6, 2018. 9 pages.
Notice of Allowance for U.S. Appl. No. 15/881,576, filed Jan. 26, 2018 on behalf of Saint-Gobain Glass France, dated Sep. 12, 2018. 9 pages.
Restriction Requirement for U.S. Appl. No. 15/531,718, filed May 30, 2017 on behalf of Saint-Gobain Glass France, dated May 21, 2018. 8 pages.
Written Opinion for Application No. PCT/EP2014/074115 filed Nov. 10, 2014 on behalf of Saint-Gobain Glass France, dated Jan. 21, 2015. 14 pages (English Translation + German Original).
Written Opinion for Application No. PCT/EP2014/074116 filed Nov. 10, 2014 on behalf of Saint-Gobain Glass France, dated Jan. 21, 2015, 17 pages (English Translation + German Original).
Written Opinion for Application No. PCT/EP2015/073625 filed Oct. 13, 2015 on behalf of Saint-Gobain Glass France, dated Dec. 9, 2015. 11 pages (German Original+ English Translation).
Written Opinion of International Application No. PCT/EP2017/054735 filed Mar. 1, 2017 on behalf of Saint-Gobain Glass France, dated May 24, 2017. 12 pages. (German original + English translation).
Written Opinion for International Application No. PCT/EP2016/063407 filed Jun. 10, 2016 on behalf of Saint-Gobain Glass France, dated Sep. 21, 2016. 13 pages. (English translation + German).
Written Opinion for International Application No. PCT/EP2016/063406 filed Jun. 10, 2016 on behalf of Saint-Gobain Glass France, dated Sep. 21, 2016. 13 pages. (English translation + German).
Non-Final Office Action for U.S. Appl. No. 15/578,213, filed Nov. 29, 2017 on behalf of Saint-Gobain Glass France, dated Oct. 9, 2019. 26 Pages.
International Search Report for International Application No. PCT/EP2016/063407 filed Jun. 10, 2016 on behalf of Saint-Gobain Glass France, dated Sep. 21, 2016. 7 pages. (German + English Translation).
International Search Report for International Application No. PCT/EP2016/063406 filed Jun. 10, 2016 on behalf of Saint-Gobain Glass France, dated Sep. 21, 2016. 7 pages. (German + English Translation).

* cited by examiner

PROJECTION ARRANGEMENT FOR A HEAD-UP DISPLAY (HUD)

CROSS REFERENCE TO RELATED APPLICATIONS

The present application is the U.S. national stage entry of International Patent Application No. PCT/EP2016/063407, filed internationally on Jun. 10, 2016, which, in turn, claims priority to European Patent Application No. 15171630.5, filed on Jun. 11, 2015.

The invention relates to a projection arrangement, a method for its production as well as its use as a head-up display.

Modern automobiles are increasingly equipped with so called head-up displays (HUDs). With a projector, for example, in the region of the dashboard or in the roof region, images are projected onto the windshield, reflected there, and perceived by the driver as a virtual image (from his point of view) behind the windshield. Thus, important data can be projected into the drivers field of vision, for example, the current driving speed, navigation or warning messages, which the driver can perceive without having to divert his glance from the road. Head-up displays can thus contribute significantly to an increase in traffic safety.

With the above described head-up displays, the basic problem arises that the projector image is reflected on both surfaces of the windshield. Thus, the driver perceives not only the desired primary image but also a slightly offset secondary image, usually weaker in intensity. The latter is commonly referred to as a ghost image. As is known, this problem is resolved in that the reflecting surfaces are arranged at an angle relative to one another deliberately selected such that the primary image and the ghost image coincide, as a result of which the ghost image is no longer distractingly noticeable. In prior art composite glasses for head-up displays, the angle is typically approx. 0.5 mrad.

Windshields comprise two glass panes that are laminated to one another via a thermoplastic film. If the surfaces of the glass panes are to be arranged at an angle as described, it is customary to use a thermoplastic film with a non-constant thickness. This is also referred to as a wedge-shaped film or a wedge film. The angle between the two surfaces of the film is referred to as a wedge angle. Composite glasses for head-up displays with wedge films are known, for example, from EP1800855B1 or EP1880243A2.

In the simple case, the wedge angle is constant over the entire film (linear change in thickness). This has the disadvantage that the wedge angle is optimized to a single viewing position (so-called eye position). If the eyes of the actual driver are situated in a different position, for example, as a result of a different body size, the compensation of the ghost image is no longer optimum. This can be improved in that instead of a constant wedge angle, a wedge angle variable in the vertical course is selected (nonlinear change in thickness), as is known, for example, from DE102007059323A1. There, the wedge angle increases (at least in the HUD region) from the top to the bottom.

Besides the ghost image in reflexion, another undesirable effect arises in windshields. As a result of the refractive behavior of the two glass panes, objects that are observed through the pane can also appear as a doubled image. This effect in transmission is commonly referred to as a double image. The double image can also be reduced by a nonlinear wedge angle, as is known from DE102008008758A1. However, the wedge angle profile required for this is exactly opposite that for preventing the ghost image (decrease in the wedge angle from top to bottom). The requirements for ghost image and double image compensation are so to speak opposed to one another. A wedge angle profile that is optimized to avoid ghost images can, consequently, amplify the effect of the double image.

The object of the invention is to provide an improved projection arrangement for a head-up display (HUD) wherein both ghost images of the HUD projection as well as double images in transmission occur to a lesser extent.

The object of the present invention is accomplished according to the invention by a projection arrangement according to the independent claims 1. Preferred embodiments emerge from the subclaims.

The projection arrangement for a head-up display (HUD) according to the invention comprises at least a vehicle windshield (in particular of a motor vehicle, for example, of an automobile) and a projector. As customary with HUDs, the projector irradiates a region of the windshield, where the radiation is reflected in the direction of the observer (driver), by which means a virtual image is generated, which the observer perceives from his viewpoint as behind the windshield. The region of the windshield which can be irradiated by the projector is referred to as the HUD region. The projector is aimed at the HUD region. The direction of irradiation of the projector can typically be varied by mirrors, in particular vertically, in order to adapt the projection to the body size of the observer. The region in which the eyes of the observer must be situated with a given mirror position is referred to as the eyebox window. This eyebox window can be shifted vertically by adjustment of the mirrors, with the entire area thus available (i.e., the overlay of all possible eyebox windows) referred to as the eyebox. An observer situated within the eyebox can perceive the virtual image. This, of course, means that the eyes of the observer must be situated within the eyebox not, for example, the entire body.

The technical terms from the field of HUDs used here are generally known to the person skilled in the art. For a detailed presentation, reference is made to the dissertation "Simulation-Based Metrology for Testing Head-Up Displays" by Alexander Neumann at the Informatics Institute of Munich Technical University (Munich: University Library of Munich TU, 2012), in particular to chapter 2 "The Head-Up Display".

The windshield comprises an outer pane and an inner pane, which are bonded to one another via a thermoplastic intermediate layer. The windshield is intended, in a window opening of a vehicle, to separate the interior from the outside environment. In the context of the invention, "inner pane" refers to the pane facing the interior (vehicle interior). "Outer pane" refers to the pane facing the outside environment.

The windshield has an upper edge and a lower edge. The term "upper edge" refers to the side edge that is intended to point upward in the installation position. "Lower edge" refers to the side edge that is intended to point downward in the installation position. The upper edge is frequently referred to as the roof edge and the lower edge as the engine edge.

The beam that runs between the projector and the center of the eyebox is commonly referred to as the central beam. It is a characteristic reference beam for the design of an HUD projection arrangement. The point at which the central beam strikes the inner pane is referred to, in the context of the invention, as the HUD reference point. The HUD reference point lies within the HUD region, typically roughly centrally.

The thickness of the intermediate layer is variable, at least in sections, in the vertical course between the upper edge and the lower edge of the windshield. Here, "in sections" means that the vertical course between the upper edge and the lower edge has at least one section in which the thickness of the intermediate layer varies depending on position, i.e., the intermediate layer has a wedge angle. The thickness of the intermediate layer is variable at least in the HUD region. However, the thickness can also vary in a plurality of sections or in the entire vertical course, for example, can increase monotonically from the lower edge to the upper edge. The term "vertical course" refers to the course between the upper edge and the lower edge with the direction of the course being substantially perpendicular to the upper edge. Since, in windshields, the upper edge can deviate greatly from a straight line, the vertical course in the context of the invention is more precisely expressed as perpendicular to the connecting line between the corners of the upper edge. The intermediate layer has, at least in sections, a finite wedge angle, i.e., a wedge angle greater than 0°, namely, in the section in which the thickness is variable.

The term "wedge angle" refers to the angle between the two surfaces of the intermediate layer. If the wedge angle is not constant, the tangents to its surface must be used for its measurement at a point.

The wedge angle is variable at least in the HUD region. Preferably, the wedge angle increases monotonically in the vertical course from the upper edge of the HUD region to the lower edge of the HUD region. With such a wedge angle profile, ghost images as a result of double reflection of the projector image can be effectively avoided for different eye positions.

The invention is based on the finding that the undesirable effect of the double image and its amplification by the variable wedge angle are decisively associated with the radii of curvature of the pane. Windshields typically have a vertical radius of curvature that is variable between the upper edge and the lower edge. The vertical radius of curvature refers to the curvature in the vertical dimension of the pane between the upper edge and the lower edge. Large radii of curvature correspond to a weak curvature; small radii of curvature, to a strong curvature of the pane. In typical, prior art windshields, the vertical radius of curvature increases in the vertical course from the upper edge towards the lower edge.

The inventors have now surprisingly found that this typical course of the radii of curvature is associated with the amplification of the double image due to the variable wedge angle and that it is possible, so to speak, to decouple the ghost image and the double image effects by shifting the maximum of the radius of curvature upward compared to the prior art pane, at least to above the HUD reference point.

Consequently, the windshield according to the invention has a vertical radius of curvature in the vertical course that is variable between the upper edge and the lower edge. This vertical course, along which the radii of curvature are determined, is selected such that it runs through the HUD reference point.

Considering now the section of this vertical course between the upper edge of the windshield and the lower edge of the HUD region (i.e., the side edge of the HUD region that faces the lower edge of the windshield), the maximum of the vertical radius of curvature in this section is situated above the HUD reference point. Here, "above" means that the maximum is closer to the upper edge of the windshield than the HUD reference point. Hence, the flattest spot of the pane is located above the HUD reference point.

Ideally, the maximum of the radius of curvature in the entire vertical course is through the HUD reference point above the HUD reference point. However, in actual panes, very flat spots, which are typically attributable to bending errors, can occur in the lower edge region. These do not, however, affect the function of the invention. Consequently, it suffices to determine the maximum in the section between the lower edge of the HUD region and the upper edge of the windshield. All preferred arrangements of the maximum curvature described refer ideally to the entire vertical course between the upper edge and the lower edge of the windshield instead of the section between the upper edge of the windshield and the lower edge of the HUD region.

In a preferred embodiment, the maximum of the vertical radius of curvature is situated above the HUD region. Thus, particularly good results are obtained in terms of prevention of double images. This variant can also be advantageous for the design, since the HUD reference point need not be known nor determined. The difference between the maximum radius of curvature and the radius of curvature at the upper edge of the HUD region is, in this case, preferably from 0.5 m to 2 m, particularly preferably from 1 m to 1.5 m.

In a preferred embodiment, the vertical radius of curvature is greater at the upper edge of the HUD region than at the lower edge of the HUD region and preferably decreases monotonically between the upper edge and the lower edge.

In a particularly preferred embodiment, the maximum of the vertical radius of curvature is situated at or above the upper edge of the A field of view per ECE-R43. Particularly good results are thus obtained.

The (variable) wedge angle is, in the HUD region, preferably from 0.05 mrad to 2 mrad, particularly preferably from 0.1 mrad to 1 mrad, in particular from 0.3 mrad to 0.8 mrad. Thus, in typical head-up displays, good results in terms of ghost image suppression are obtained.

In an advantageous embodiment, the vertical radius of curvature in the HUD region is from von 6 m to 10 m, preferably from 7 m to 9 m. Thus, double images can be particularly effectively prevented.

The maximum of the vertical radius of curvature is preferably from 8 m to 10 m.

The vertical radii of curvature of the entire windshield are preferably in the range from 1 m to 40 m, particularly preferably 2 m to 15 m, in particular 3 m to 13 m.

The installation angle of the windshield is typically in the range from 55° to 75° relative to the horizontal, in particular from 58° to 72°. With these installation angles, the wedge angles according to the invention can be realized with no problem. In a particularly advantageous embodiment, the installation angle is from 60° to 68° relative to the horizontal, preferably 63° to 67°. Thus, particularly small wedge angles of the intermediate layer can be obtained.

The angle of incidence of the central beam on the windshield is preferably in the range from 50° to 75°, particularly preferably in the range from 60° to 70° and is, for example, 65°. The angle of incidence is measured relative to the direction of the perpendicular on the windshield.

The HUD region is, in the case of a contact analog HUD, typically larger than in the case of a conventional static HUD. In a preferred embodiment, the area of the HUD region according to the invention is at least 7% of the area of the windshield, particularly preferably at least 8%. The area of the HUD region of a static HUD is typically at most 4-5% of the area of the windshield. For example, the area of the HUD region is from 40,000 mm$^2$ to 125,000 mm$^2$.

The outer pane and the inner pane preferably contain glass, in particular soda lime glass. However, the panes can, in principle, also contain other types of glass, such as quartz glass or borosilicate glass, or even or rigid clear plastics, in particular polycarbonate or polymethyl methacrylate. The thickness of the outer pane and of the inner pane can vary widely. Advantageously, the individual panes have, in each case, a thickness that is a maximum of 5 mm, preferably a maximum of 3 mm. Preferably panes with a thickness in the range from 0.8 mm to 5 mm, preferably from 1.4 mm to 2.5 mm, are used, for example, those with the standard thicknesses 1.6 mm or 2.1 mm.

The thermoplastic intermediate layer contains at least a thermoplastic polymer, preferably ethylene vinyl acetate (EVA), polyvinyl butyral (PVB), or polyurethane (PU) or mixtures or copolymers or derivatives thereof, particularly preferably PVB. The minimum thickness of the thermoplastic bonding film is preferably from 0.2 mm to 2 mm, particularly preferably from 0.3 mm to 1 mm. "Minimum thickness" refers to the thickness at the thinnest point of the intermediate layer. The thermoplastic intermediate layer is formed by at least one thermoplastic bonding film with a variable thickness, a so-called "wedge film" with a variable wedge angle at least in sections.

The thickness of the intermediate layer can be constant in horizontal sections (i.e., sections roughly parallel to the upper edge and the lower edge). In that case, the thickness profile is constant over the width of the composite glass. However, the thickness can also be variable in horizontal sections. In that case, the thickness is variable not only in the vertical but also in the horizontal course.

The intermediate layer can be implemented by a single film or even by more than one film. In the latter case, at least one of the films must be implemented with the wedge angle. The intermediate layer can also be implemented as a so-called "acoustic film", which has a noise-damping effect, or contain such a film. Such films typically consist of at least three layers, with the middle layer having higher plasticity or elasticity than the outer layers surrounding it, for example, as a result of a higher plasticizer content.

The outer pane, the inner pane, and the thermoplastic intermediate layer can be clear and colorless, but also tinted or colored. In a preferred embodiment, the total transmittance through the composite glass is greater than 70%. The term "total transmittance" is based on the process for testing the light permeability of motor vehicle windows specified by ECE-R 43, Annex 3, § 9.1.

The windshield according to the invention can have a functional coating, for example, an IR reflecting or absorbing coating, a UV reflecting or absorbing coating, a low emissivity coating, a heatable coating. The functional coating can be arranged on the outer pane or on the inner pane. The functional coating is preferably arranged on the surface of the pane facing the thermoplastic intermediate layer, where it is protected against corrosion and damage. The functional coating can also be arranged on an insertion film in the intermediate layer, made, for example, of polyethylene terephthalate (PET).

The invention includes, moreover, a method for producing a projection arrangement for an HUD, wherein the projection arrangement comprises:
  a motor vehicle windshield, including an outer pane and an inner pane, which are bonded to one another via a thermoplastic intermediate layer, with an upper edge and a lower edge and an HUD region, wherein the thickness of the thermoplastic intermediate layer is variable in the vertical course between the upper edge and the lower edge at least in sections with a wedge angle, wherein the wedge angle is variable at least in the HUD region; and
  a projector, which is aimed at the HUD region and generates a virtual image that an observer situated within an eyebox can perceive.

The method according to the invention comprises at least the following process steps:
  (a) Calculating an HUD reference point, at which the central beam running between the projector and the center of the eyebox strikes the inner pane, from the planned relative arrangement of the windshield, the projector, and the eyebox;
  (b) Creating a profile of the vertical radius of curvature, which is variable in the vertical course between the upper edge and the lower edge through the HUD reference point, such that the maximum of the vertical radius of curvature is situated in the section of the course between the lower edge of the HUD region and the upper edge of the windshield above the HUD reference point;
  (c) Producing the windshield with the wedge angle and the calculated course of the vertical radius of curvature;
  (d) Relative arrangement of the windshield and the projector, wherein the projection arrangement is created.

The particular advantage of the method resides in the fact that the curvature profile of the windshield is included in the design of the projection arrangement.

The thicknesses of the panes as well as the installation position are typically already defined in the design of the HUD. On this basis, a wedge angle can also be determined theoretically such that ghost images are optimally minimalized. The calculation of the wedge angle course is done by means of simulations customary in the art.

Also, the relative arrangement between the windshield and the projector must be established. This yields the position of the eyebox. From these data, the central beam as well as the HUD reference point can be calculated.

When the HUD reference point is determined, the profile of the vertical curvature profile is determined according to the invention. Since the curvature profile can also influence the ghost image, adaptation of the wedge angle can be necessary at this time. The final determination of the pane geometry with the wedge angle and the curvature profile can be done iteratively until the ghost and double image problems are minimized.

All steps described thus far typically occur in the design phase, typically using the CAD data of the vehicle. After the final pane geometry has been established, the pane can be produced.

The thermoplastic intermediate layer is provided as a film. The wedge angle can be introduced into the film by stretching a film having (in the initial state) substantially constant thickness or by extrusion using a wedge-shaped extrusion die.

Before lamination, the outer pane and the inner pane are below subjected to a bending process corresponding to the calculated curvature profile. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C.

The production of the composite glass is done by lamination with customary methods known per se to the person skilled in the art, for example, autoclave methods, vacuum bag methods, vacuum ring methods, calender methods, vacuum laminators, or combinations thereof. The bonding of the outer pane and the inner pane is customarily done under the action of heat, vacuum, and/or pressure.

Then, the windshield and the projector are arranged relative to one another, typically by installation of the windshield and the projector in the vehicle body. Thus, the projection arrangement according to the invention is created.

The invention includes, moreover, the use of the projection arrangement according to the invention in a vehicle as a head-up display (HUD), preferably in a motor vehicle, particularly preferably in an automobile.

In the following, the invention is explained in detail with reference to drawings and exemplary embodiments. The drawings are schematic representations and are not true to scale. The drawings in no way restrict the invention.

Figure 2:
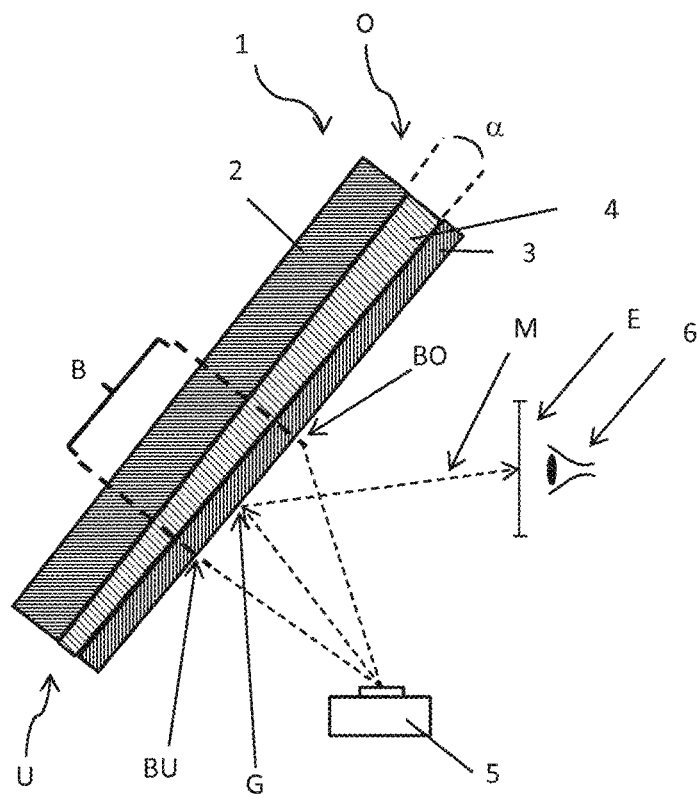
Figure 3:
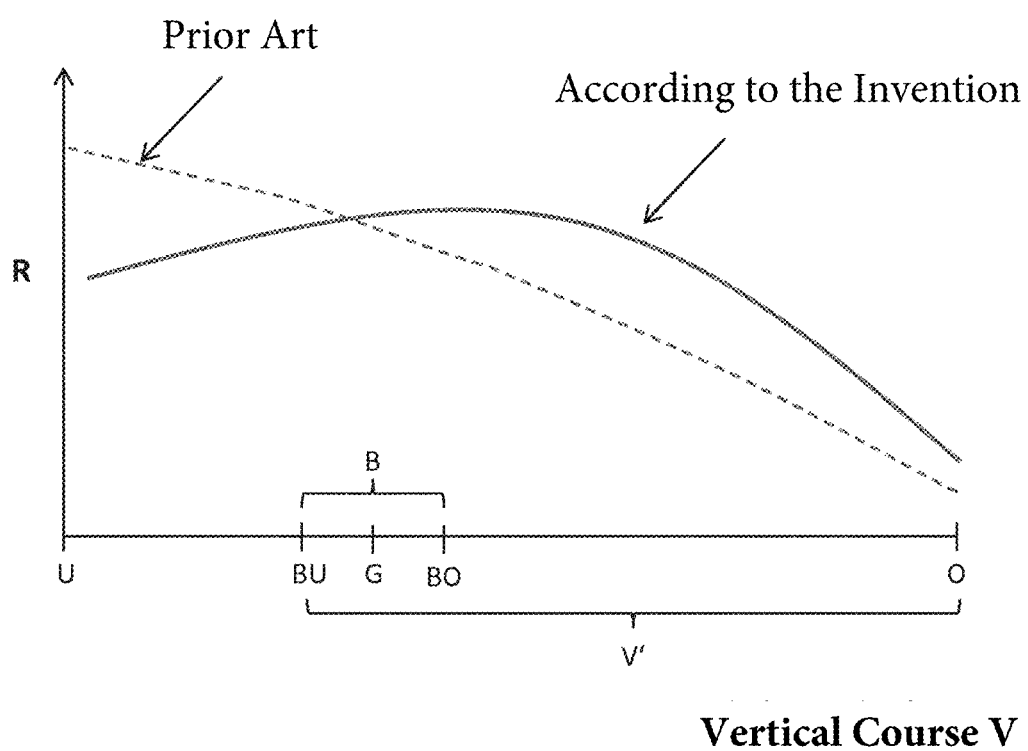
Figure 4:
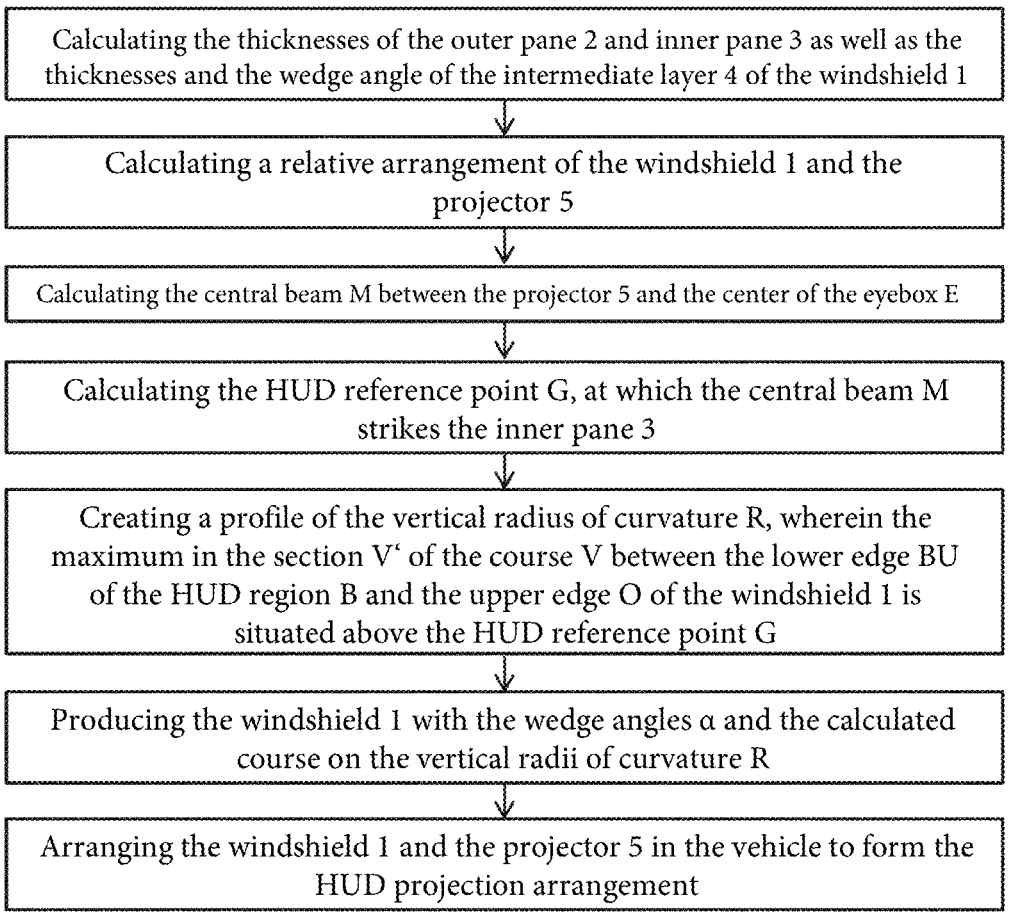
Figure 5:
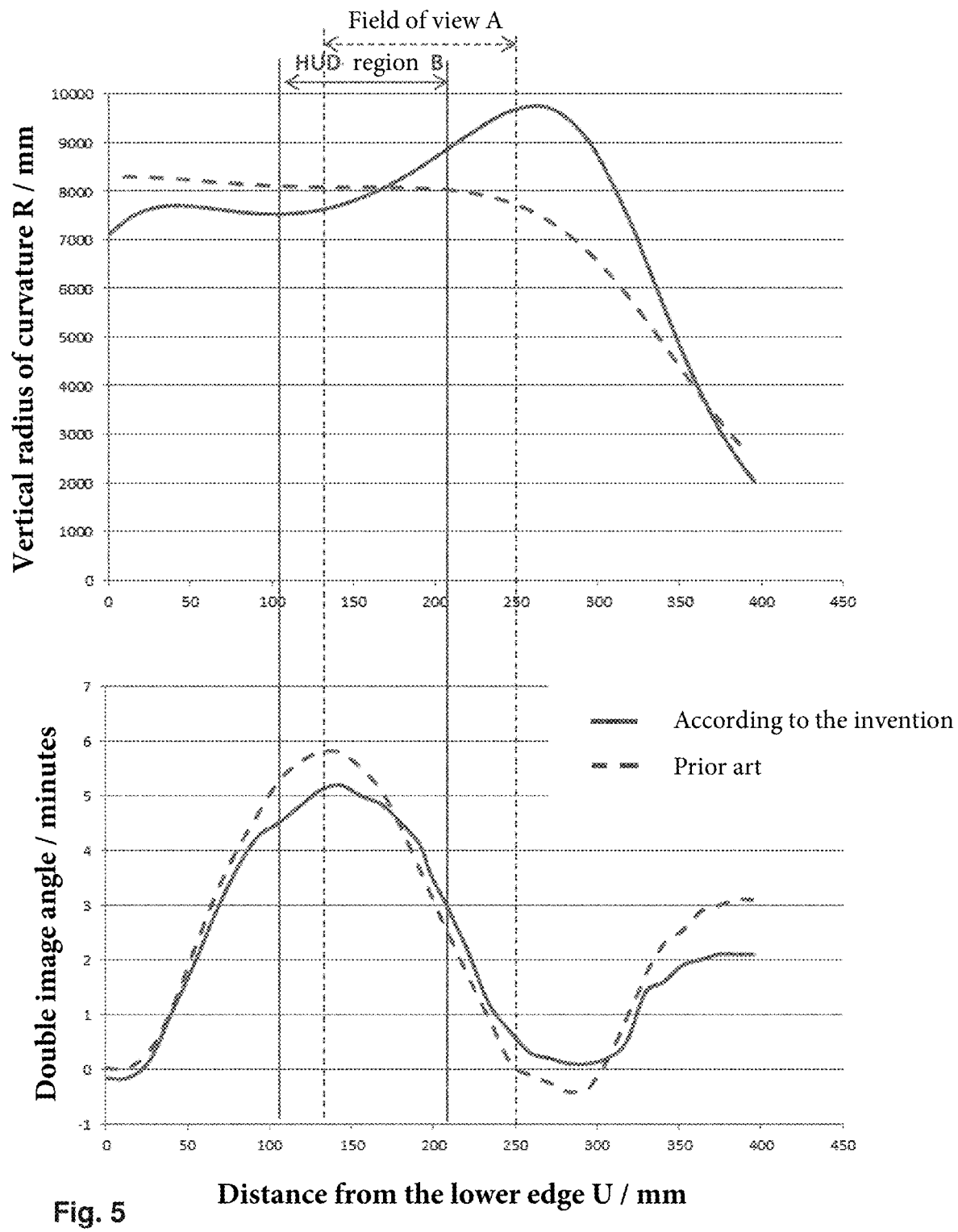

They depict:

FIG. 1 a plan view of the windshield of a projection arrangement according to the invention, FIG. 2 a cross-section through a projection arrangement according to the invention, FIG. 3 a schematic diagram of the course of radii of curvature of the windshield according to the invention, FIG. 4 a flowchart of an embodiment of the method according to the invention, and FIG. 5 a graph of the vertical radius of curvature and of the resultant double image angle.

FIG. 1 depicts a plan view of a windshield 1 of a projection arrangement according to the invention. The windshield 1 has an upper edge O, a lower edge U, and two side edges connecting them. The upper edge O points upward, in the installation position, toward the vehicle roof (roof edge); the lower edge U, downward toward the engine compartment (engine edge). The windshield 1 has an HUD region B, which, in the installation position, can be irradiated by the HUD projector and is irradiated during operation. The HUD region B is delimited by an upper edge (BO), a lower edge (BU), and two side edges connecting them. Also sketched in are the HUD reference point G, which is explained more precisely in the following, as well as the vertical course V between the upper edge O and the lower edge U through the HUD reference point G.

FIG. 2 depicts a cross-section through a projection arrangement according to the invention along the vertical course V, comprising the windshield 1 of FIG. 1 as well as an HUD projector 5. The windshield 1 comprises an outer pane 2 and an inner pane 3, which are bonded to one another via a thermoplastic intermediate layer 4. The windshield separates the vehicle interior from the outside environment, wherein, in the installation position, the outer pane 2 faces the outside environment; the inner pane 3, the vehicle interior.

The outer pane 2 is made, for example, of soda lime glass with a thickness of 2.1 mm. The inner pane 3 is made, for example, of soda lime glass with a thickness of 1.6 mm. These panes are customary for windshields. The thickness of the intermediate layer 4 increases monotonically in the vertical course from the lower edge U to the upper edge O. For the sake of simplicity, the increase in thickness is depicted in the figure as linear with a constant wedge angle α between the two surfaces. The intermediate layer 4 according to the invention has, however, a more complex nonlinear increase in thickness, at least in sections, with a nonconstant wedge angle α. The intermediate layer 4 is formed from a single film made of PVB. The thickness of the intermediate layer 4 at the upper edge O is, for example, 1.25 mm and at the lower edge U, for example, 0.76 mm.

The projector 5 is aimed at the HUD region B. Images are to be produced in this region by the projector 5. The projector image is reflected in the direction of the observer 6 (vehicle driver) by the windshield 1. Thus, a virtual image (not shown) is created behind the windshield 1 from the point of view of the observer 6. The observer 6 can perceive the data thus represented without having to look away from the road.

By means of the wedge-shaped implementation of the intermediate layer 4, the two images that are produced by reflection of the projector image on the two surfaces of the outer pane 2 and the inner pane 3 turned away from the intermediate layer 4 coincide with one another. Consequently, disruptive ghost images occur to a lesser extent. The wedge angle α is variable, at least within the HUD region B in the vertical course and increases monotonically from the upper edge BO to the lower edge BU. The wedge angle α is, for example, 0.3 mrad at the upper edge BO, 0.5 mrad at the HUD reference point G, and 0.8 mrad at the lower edge BU. The variable wedge angle α enables the optimization of the effect (suppression of ghost images) to various eye positions, resulting, for example, from different body sizes of drivers.

The region, within which the eyes of the observer 6 must be situated in order to perceive the virtual image, is referred to as the eyebox window. The eyebox window is vertically adjustable by mirrors in the projector 5 in order to be able to adapt the HUD to observers 6 of different body size and sitting position. The entire accessible region within which the eyebox window can be shifted is referred to as the eyebox E. The beam that connects the projector 5 to the center of the eyebox E (usually the mirrors of the projector 5 are in the neutral position in this case) is referred to as the central beam M. The HUD reference point G corresponds to the point on the inner pane 3 at which the central beam M strikes. In the design of HUD projection arrangements, the reference point G is a characteristic variable.

FIG. 3 depicts a comparison of the profile of vertical radii of curvature R in the vertical course V between the lower edge U and the upper edge O of prior art windshields and an embodiment of the windshield 1 according to the invention. In prior art windshields, the vertical radius of curvature R typically increases continuously from the upper edge O to the lower edge U.

The windshield according to the invention 1 is distinguished by a course of vertical radii of curvature R deviating therefrom. When one considers a section V' of the vertical course V between the lower edge BU of the HUD region B and the upper edge O of the windshield 1 and determines, in this section V', the maximum of the vertical radius of curvature R, this maximum is located above the HUD reference point G, in other words, between the HUD reference point G and the upper edge O. In the preferred embodiment depicted, the maximum is situated above the HUD region B. In the HUD region B, the radius of curvature decreases monotonically from the upper edge BO to the lower edge BU.

The vertical radius of curvature R is, in the maximum, for example, 9.5 m and decreases in the HUD region from 9 m to the upper edge BO 27.5 at the lower edge BU.

The projection arrangement according to the invention includes, for the first time, the course of the radii of curvature of the windshield in the design of an HUD. The variable wedge angle, increasing from the top toward the bottom, which effectively reduces the ghost images in reflection, actually has until now resulted in the fact that double images in transmission are amplified. The inventors found that this effect is amplified by the curvature profile of prior art windshields, in which the flattest spot (maximum radius of curvature) is located below the HUD region. By means of the curvature profile according to the invention, in which the flattest spot is located above the HUD reference point G, the ghost image and the double image can, as it were, be decoupled from one another and the amplifying effect of the wedge angle course on the double image is reduced. This is the major advantage of the invention.

FIG. 4 depicts a flowchart of an exemplary embodiment of the method according to the invention for producing a projection arrangement for a head-up display.

FIG. 5 shows a graph that demonstrates the advantageous effect of the course of vertical radii of curvature R. In the upper diagram, the vertical course of the vertical radius of curvature R is plotted for a prior art windshield and a windshield according to the invention with, in each case, identically designed variable wedge angles. Whereas the vertical radius of curvature R according to the prior art increases constantly with a decreasing distance from the lower edge, in the example according to the invention, it has a maximum that is situated above the HUD region B and slightly above the upper edge of the A field of view per ECE-R43.

The effect is clear in the lower diagram, where the resultant double image angle is shown. The wedge angle course is optimized in the HUD region B to prevent a ghost image, such that reflections of the HUD projection on the different surfaces coincide with one another. However, this can result in the fact that the double image problem is amplified, i.e., objects observed through the pane appear amplified as a double image. It is discernible that the double image angle is significantly reduced by the course according to the invention of the vertical radius of curvature R, as a result of which the double image is less disruptive.

The invention relates to a projection arrangement for a head-up display (HUD), at least comprising a vehicle windshield, comprising an outer pane and an inner pane, which are bonded to one another via a thermoplastic intermediate layer, with an upper edge and a lower edge and an HUD region; and a projector, which is aimed at the HUD region and generates a virtual image, which an observer situated within an eyebox can perceive, wherein the windshield has an HUD reference point, at which a central beam running between the projector and the center of the eyebox strikes the inner pane, the thickness of the thermoplastic intermediate layer in the vertical course between the upper edge and the lower edge is variable at least in sections with a wedge angle ($\alpha$), wherein the wedge angle ($\alpha$) is variable at least in the HUD region, the windshield has a vertical radius of curvature, which is variable in the vertical course between the upper edge and the lower edge through the HUD reference point, wherein the maximum of the vertical radius of curvature is situated in the section of the course between the upper edge of the windshield and the lower edge of the HUD region above the HUD reference point.

LIST OF REFERENCE CHARACTERS (1) windshield
(2) outer pane
(3) inner pane
(4) thermoplastic intermediate layer
(5) projector
(6) observer/vehicle driver
(O) upper edge of the windshield 1
(U) lower edge of the windshield 1
(B) HUD region of the windshield 1
(BO) upper edge of the HUD region B
(BU) lower edge of the HUD region B
$\alpha$ wedge angle of the intermediate layer 4
R vertical radius of curvature of the windshield 1
(V) vertical course of the radius of curvature R between the upper edge O and the lower edge U
(V') section of V between the upper edge O of the windshield 1 and the lower edge BU
(E) eyebox
(M) central beam (between the projector 5 and the center of the eyebox E)
(G) HUD reference point

The invention claimed is:

1. A projection arrangement for a head-up display (HUD), comprising:
   i) a vehicle windshield, comprising an outer pane and an inner pane that are bonded to one another via a thermoplastic intermediate layer, the vehicle windshield having an upper edge and a lower edge (U) and an HUD region,
   wherein the vehicle windshield has an installation angle in a range from 55° to 75°, and
   wherein each of the outer pane and the inner pane have a respective thickness of a maximum of 5 mm; and
   ii) a projector aimed at the HUD region that is configured to generate a virtual image perceivable by an observer situated within an eyebox,
   wherein:
   the windshield has an HUD reference point at which a central beam running between the projector and a center of the eyebox strikes the inner pane,
   a thickness of the thermoplastic intermediate layer in at least one section of a vertical course between the upper edge and the lower edge is variable according to a wedge angle $\alpha$, the at least one section comprising a section corresponding to the HUD region,
   the windshield has a vertical radius of curvature R, which is variable in the vertical course between the upper edge and the lower edge through the HUD reference point, wherein a maximum value of the vertical radius of curvature R is situated in a section of the vertical course between the upper edge of the windshield and a lower edge of the HUD region above the HUD reference point,
   wherein the vertical radius of curvature R at an upper edge of the HUD region is greater than at the lower edge of the HUD region, and decreases monotonically between the upper edge and the lower edge.

2. The projection arrangement according to claim 1, wherein the maximum value of the vertical radius of curvature R is situated above the HUD region.

3. The projection arrangement according to claim 1, wherein the maximum value of the vertical radius of curvature R is situated at or above an upper edge of the A field of view per ECE-R43.

4. The projection arrangement according to claim 1, wherein the maximum value of the vertical radius of curvature R in the entire vertical course between the upper edge of the windshield and the lower edge of the windshield is situated above the HUD reference point.

5. The projection arrangement according to claim 1, wherein the wedge angle $\alpha$ increases monotonically in the vertical course from an upper edge of the HUD region to a lower edge of the HUD region.

6. The projection arrangement according to claim 1, wherein the wedge angle α in the HUD region is from 0.05 mrad to 2 mrad.

7. The projection arrangement according to claim 1, wherein the wedge angle α in the HUD region is from 0.1 mrad to 1 mrad.

8. The projection arrangement according to claim 1, wherein a value of the vertical radius of curvature R in the HUD region is in a range of 6 m to 10 m.

9. The projection arrangement according to claim 1, wherein a value of the vertical radius of curvature R in the HUD region is in a range of 7 m to 9 m.

10. The projection arrangement according to claim 1, wherein values of vertical radii of curvature R of the entire windshield are in a range of 1 m to 20 m.

11. The projection arrangement according to claim 1, wherein values of vertical radii of curvature R of the entire windshield are in a range of 2 m to 15 m.

12. The projection arrangement according to claim 1, wherein the outer pane and the inner pane contain soda lime glass, and have a respective thickness from 0.8 mm to 5 mm.

13. The projection arrangement according to claim 12, wherein the outer pane and the inner pane have a respective thickness 1.4 mm to 2.5 mm.

14. The projection arrangement according to claim 1, wherein the outer pane and the inner pane contain soda lime glass, and have a respective thickness from 1.4 mm to 2.5 mm.

15. The projection arrangement according to claim 1, wherein the thermoplastic intermediate layer contains at least one of: a) polyvinyl butyral (PVB), b) ethylene vinyl acetate (EVA), c) polyurethane (PU), and d) mixtures or copolymers or derivatives of a), b) or c).

16. The projection arrangement according to claim 15, wherein the thermoplastic intermediate layer has a minimum thickness value in a range of 0.2 mm to 2 mm.

17. The projection arrangement according to claim 15, wherein the thermoplastic intermediate layer has a minimum thickness value in a range of 0.3 mm to 1 mm.

18. The projection arrangement according to claim 1, wherein the thermoplastic intermediate layer contains PVB.

19. The projection arrangement according to claim 1, wherein the thermoplastic intermediate layer is implemented as a noise-damping, multilayer film.

20. A method for producing a projection arrangement for a head-up display (HUD) according to claim 1, the projection arrangement comprising:

iii) a vehicle windshield, including an outer pane and an inner pane that are bonded to one another via a thermoplastic intermediate layer, the vehicle windshield having an upper edge and a lower edge and an HUD region, wherein a thickness of the thermoplastic intermediate layer in at least one section of a vertical course between the upper edge and the lower edge is variable according to a wedge angle α, the at least one section comprising a section corresponding to the HUD region; and iv) a projector aimed at the HUD region that is configured to generate a virtual image perceivable by an observer situated within an eyebox;

wherein the method comprises:
(a) calculating, based on a planned relative arrangement of the windshield, the projector and the eyebox, an HUD reference point at which a central beam running between the projector and the center of the eyebox strikes the inner pane;
(b) creating a profile of a vertical radius of curvature R, so that:
(b1) the vertical radius of curvature is variable in the vertical course between the upper edge and the edge through the HUD reference point, and
(b2) a maximum value of the vertical radius of curvature R in a section of the vertical course between a lower edge of the HUD region and the upper edge of the windshield is situated above the HUD reference point;
(c) producing the windshield having the wedge angle α and the vertical radius of curvature R according to the created profile; and
(d) arranging the windshield and the projector relative to one another so to create the projection arrangement.

21. A method, comprising using of the projection arrangement according to claim 20 in a vehicle as a head-up display (HUD), the vehicle comprising one or more of: a) a motor vehicle, and b) an automobile.

* * * * *